Patented Feb. 8, 1938

2,107,379

UNITED STATES PATENT OFFICE 2,107,379

MANUFACTURE OF CARBOCYANINE DYES

Robert Koslowsky, Dessau-Ziebigk in Anhalt, Germany, assignor to Agfa Ansco Corporation, Binghamton, N. Y., a corporation of New York No Drawing. Application January 14, 1933, Serial No. 651,811. In Germany January 18, 1932

26 Claims. (Cl. 260—44)

My present invention relates to the manufacture of carbocyanine dyes.

One of its objects is a process of manufacturing symmetrical and unsymmetrical carbocyanine dyes substituted at the central carbon atom of the trimethenyl chain which are suitable for sensitizing a silver halide emulsion. Another object is the unsymmetrical dyes. Further objects will be seen from the detailed specification following hereafter. Reference is made to the accompanying drawing which instances the spectral region to which a silver-halide gelatin emulsion sensitized by my new dyes is sensitive and the spectrogram of an unsensitized emulsion.

I have found that symmetrical and unsymmetrical dyestuffs of the polymethine series which are substituted at the central carbon atom of the polymethine chain can be obtained by condensing the salt of a quaternary ammonium base containing in α-position a methyl group capable of reaction and corresponding with the general formula (1) 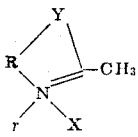

$r$=alkyl
R=vinylene, phenylene, naphthylene, etc.,
X=Cl, Br, I, SO₄CH₃, ClO₄ or another acid radical capable of precipitating the dye with an alkyl ester of an arylated thioimide corresponding with the general formula (2) 

R₃=alkyl or aryl
R₄=alkyl
R₅=phenyl or substituted phenyl.

In the above formulae Y may represent sulfur, selenium, oxygen or the group $$C{<}^{R_1}_{R_2}$$

wherein R₁ and R₂ represent an alkyl group, for instance, methyl or ethyl groups or aryl radicals, for instance, phenyl and R₁ and R₂ can be the same group or different groups. $r$ can be alkyl, for instance, methyl or ethyl. R may represent vinylene, phenylene, naphthylene, or the radical of a polynuclear ring system, for instance, the radical of anthracene, phenanthrene, fluorene, diphenylene oxide, etc. X may be halide, perchlorate, alkylsulfate, para-toluenesulfonate, nitrate or any other suitable anion. R₃ stands for alkyl, for instance, methyl, ethyl, propyl, butyl, amyl, isoamyl etc. or for an aryl radical, for instance, phenyl or for a substituted aryl radical, for instance, substituted by an alkyl group or an alkoxyl group. R₄ stands for alkyl, for instance, methyl, ethyl, propyl, butyl, amyl, isoamyl, etc. R₅ stands for phenyl or a substituted product of phenyl, for instance phenyl substituted by a methyl group or a nitrogen group.

Symmetrical dyes may be produced by condensing 1 molecular proportion of a quaternary ammonium salt and about ½–1½ molecular proportions of thioimide in presence of a basic condensing agent, for instance, pyridine. The principal advantage of the manufacture of the symmetrical dyestuffs according to the present process lies in the replacement of the expensive ortho esters hitherto used by the cheaper thioimides.

The unsymmetrical dyes substituted at the central carbon atom of the polymethine chain may be produced by condensing 1 molecular proportion of quaternary ammonium salt with about 1½ molecular proportions of thioimide. The condensation is conducted in the presence of an acid condensing agent, for instance, acetic anhydride, propionic anhydride, or glacial acetic acid, the first named being preferred. The condensation may however also be conducted by heating the quaternary ammonium salt with the thioimide without any addition. The method first described, i. e. the condensation in the presence of an acid condensing agent is preferred for the production of dyes substituted at the central carbon atom of the polymethine chain by a methyl group, whereas the condensation by simply heating the components without any addition is preferred for those substituted at the central carbon atom by an ethyl group. This condensation yields an intermediate product which is then condensed in the presence of a basic agent, for instance, pyridine, with a quaternary ammonium salt different from that used for the production of the intermediate product. The reaction for obtaining the intermediate product by condensation in the presence of an acid agent is illustrated by the following equation in this case, in general Formula (1) Y is S, R is phenylene, r is methyl and X is iodine, and in the general Formula (2) $R_3$ is $CH_3$, $R_4$ is $C_2H_5$ and $R_5$ is $C_6H_5$:

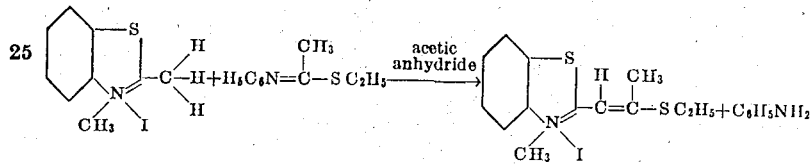

From the intermediate product a dye may be obtained, for instance, by condensation with benzoselenazole ethiodide according to the following equation:

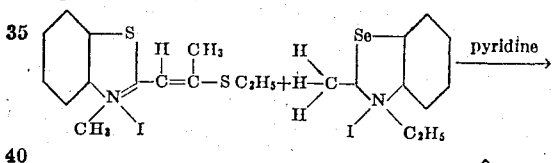

When making the intermediate product by simply heating the components without any addition, the reaction probably takes the following course; in this case $R_3$ is $C_2H_5$:

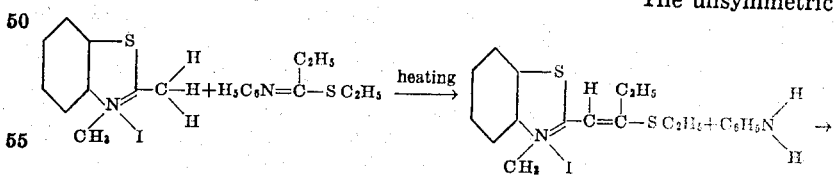

The formation of the dye from this intermediate product probably proceeds as follows:

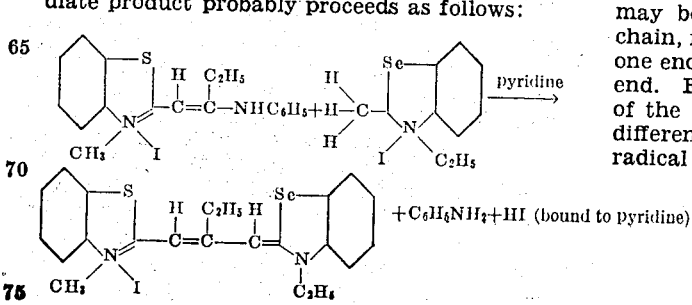

It is obvious that by condensing the intermediate product with the same quaternary ammonium salt as used for the production of the intermediate product a symmetrical dye will be obtained. The symmetrical dyes can therefore be obtained according to a single stage process or by a two stage process.

The dyes obtainable according to this invention, the symmetrical dyes as well as the unsymmetrical dyes are powerful sensitizers for photographic silver halide emulsions.

The unsymmetrical dyes substituted at the central carbon atom of the polymethine chain which, up to date, could not be produced correspond with the following general formula:

(3) 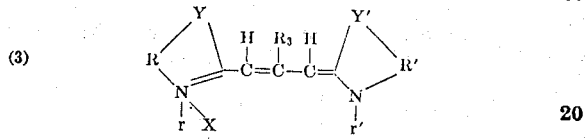

In this formula Y and Y' stand for the same radicals as indicated for Y in general Formula (1), R and R' stand for the same radicals as indicated for R in Formula (1), r and r' stand for the same radical as indicated for r in Formula (1), X stands for the same radicals as indicated in Formula (1) and $R_3$ stands for the same radicals as indicated for $R_3$ in Formula (2).

The unsymmetrical character of the dyes may have the following causes. Two different bases may be linked to the ends of the polymethine chain, for instance, a benzthiazole nucleus to the one end and a benzselenazole nucleus to the other end. Furthermore the nuclei linked to both ends of the polymethine chain may be substituted by different radicals, or they may contain the same radical in different positions or they may contain different radicals in different positions. This is illustrated by the following formulae:

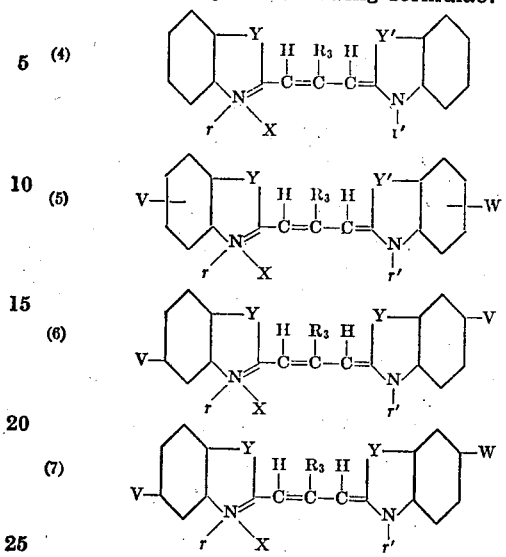

The unsymmetrical character of the dyes may be due to other variations in the substituents, for instance, to a difference in the radicals $r$ and $r'$. The benzene nucleus may be substituted by other nuclei as seen from the description of Formulae (1) and (3). The substituents V and W stand for any suitable radical, for instance, an alkyl group, for instance, methyl or ethyl, or an alkoxyl group, such as a methoxy group or an ethoxy group, or halide, or an amino group, or a substituted amino group, for instance, a dialkylamino group, or an acyl amino group.

The nomenclature employed in the description is familiar to the chemist skilled in the art and is believed to have the advantage of clearness. In the case of the dyes numbering is commenced from the nitrogen atom of the 5 ring and in the case of the bases numbering is commenced from $y$ of the 5 ring.

The dyes are obtainable according to the desired solubility in form of the bromide, iodide, perchlorate etc. and are used in a quantity as usual for the known sensitizing dyes. This quantity amounts to about 5 to 30 milligrams for the unsymmetrical carbocyanines substituted at the central carbon atom of the trimethine chain by the methyl group and for the unsymmetrical carbocyanines substituted at the central carbon atom by the ethyl group to about 10 to 40 milligrams per 1 kg. of emulsion ready for being cast which contains about 9 per cent of gelatin, 4.5 per cent of silver-halide, the rest being water. However, I do not wish to limit my invention to the quantities just indicated as, the most suitable amount will in each case be found by a few comparative experiments. The dyes may be incorporated in the emulsion during its production or after it has been applied to a support.

The dyes are suited for sensitizing an emulsion made according to the boiling process as well as for sensitizing an emulsion made according to the ammonia process.

The preparation of the bases serving as a starting material is analogous to known methods. In the production of substituted benzthiazoles one starts from the correspondingly substituted amino-benzenes, which are made by means of acetic anhydride into their acetyl compound. This latter is converted, according to the method of Jacobson and Süllwald (Berichte der Deutschen Chemischen Gesellschaft, vol. 21, page 2627) into the thioacet-compound by means of phosphoruspentasulfide. By oxidation with potassium ferricyanide in alkaline solution the substituted benzthiazoles are obtained.

For the production of 2-methylbenzthiazoles substituted in the benzene nucleus which do not appear to have been described as yet, the zinc salt of a correspondingly substituted ortho-amino-seleno-phenol of the formula

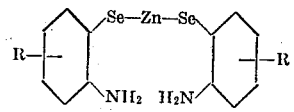

R=alkyl, alkoxy, substituted amino groups, halogen is boiled with acetic anhydride, or a disubstituted ortho-diamino-diphenyl-diselenide of the formula

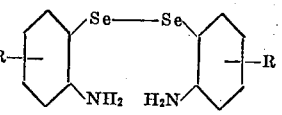

is boiled with acetic acid with addition of zinc dust.

So, for instance, for producing the 5-ethoxy-2-methyl-benzselenazole, the 1-amino-2-nitro-4-ethoxybenzene is converted according to the method of Bauer (Berichte der Deutschen Chemischen Gesellschaft, vol. 46, 1913, pages 92–97), into 4.4'-diethoxy-2.2'-diamino-ortho-diphenyl-diselenide by way of the intermediate product 2-nitro-4-ethoxy-phenyl-seleno-cyanide. The diselenide is boiled with zinc dust whereby the 5-ethoxy-2-methyl-benzselenazole is formed.

In a completely analogous manner other benzselenazoles substituted in the benzene nucleus may be obtained.

The production of the 4-, 5-, or 7-amino substituted 2-methyl-benzthiazoles serving as a starting material for preparing the dyes is as follows:

The preparation of 2-methyl-6-amino-benzthiazole corresponding to the formula

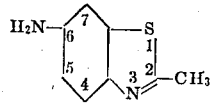

is described in U. S. Patent 1,758,385, and reference is made thereto.

The base 2-methyl-5-amino-benzthiazole corresponding to the formula

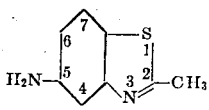

is obtained by reducing the corresponding nitro compound whose method of preparation is known (cf. Friese, Ann. 454, page 177), for instance, with iron and acetic acid. The amino compound is easily soluble in alcohol, glacial acetic acid and benzene. It can be easily recrystallized from water or benzene and forms colorless crystals which melt at about 103° C.

The base 2.6-dimethyl-5-amino-benzthiazole corresponding to the formula

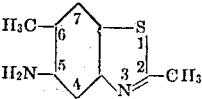

can be obtained in two ways.

According to the first way one proceeds as follows: 2-amino-4-acetylamino-toluol corresponding to the formula

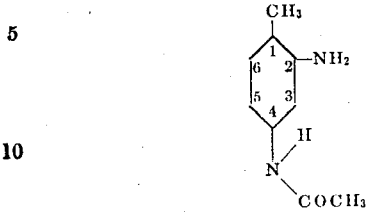

is first rhodanated with NH₄ SCN and Br in its methylalcoholic solution in the manner described in U. S. Patent 1,787,315 and then with an aqueous ammoniacal solution. The formed product, probably the 2.5-diamino-6-methyl-benzthiazole corresponding to the formula

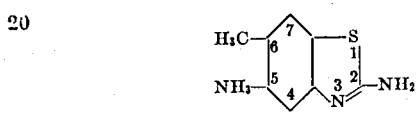

obtained from its aqueous solution in form of colorless crystals which melt at about 200° C. is split up by heating the same with an aqueous solution of caustic potassium of about 50 per cent strength in the manner described in U. S. Patent 1,788,297 in a compound corresponding to the formula

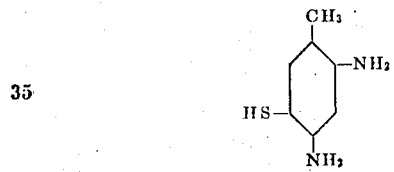

The zinc mercaptide of this compound is transformed into the 2.6-dimethyl-5-acetylaminobenzthiazole with a melting point of about 178° C. corresponding to the above formula by heating the aforesaid mercaptide with acetic anhydride.

According to the second way 3-chloro-4-acetylamino-6-nitro-toluene having a melting point of 143° C. is transformed into 2.6-dimethyl-5-nitro-benzthiazole forming compact, colorless crystals when crystallized from alcohol, which melt at about 106° C. This compound yields the 2.6-dimethyl-5-amino-benzthiazole when reduced with iron and acetic acid, forming colorless crystals which melt at about 143° C. The thiazole can be easily acetylated.

The base 2.4-dimethyl-6-amino-benzthiazole corresponding to the formula

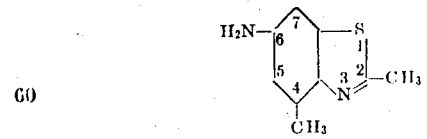

is obtained as follows. Acetyl-toluylene-diamine corresponding to the formula

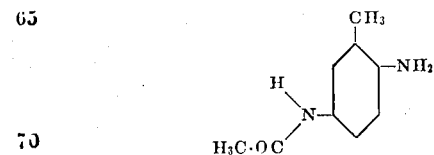

is by means of S₂Cl₂ transformed into the thiazthionium compound in the manner described in U. S. Patent 1,637,023. When treating this compound with a solution of caustic alkali according to U. S. Patent 1,243,710 the corresponding o-amino-mercaptane corresponding to the formula

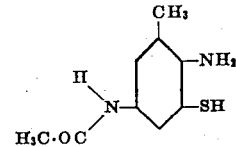

is obtained. By heating this compound with acetic anhydride it is transformed into 2.4-dimethyl-6-acetyl-amino-benzthiazole which crystallizes from its aqueous solution in the form of colorless crystals melting at about 177° C. By saponification with hydrochloric acid results the 2.4-dimethyl-6-amino-benzthiazole which forms colorless crystals melting at about 118° C.

The base 2.4.6-trimethyl-7-amino-benzthiazole corresponding to the formula

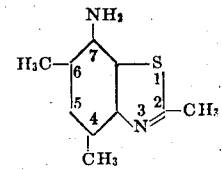

is obtainable as follows. Amino-acetylamino-xylidin corresponding to the formula

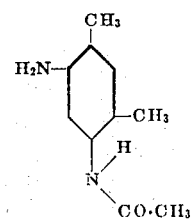

is rhodanated according to U. S. Patent 1,787,315 whereby 2-amino-4.6-dimethyl-7-acetylamino-benzthiazole corresponding to the formula

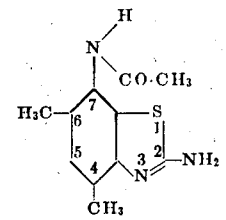

and melting at about 285° C. is obtained. By boiling this compound with a strong aqueous solution of caustic alkali according to U. S. Patent 1,788,297 it is split up to the corresponding o-amino-mercaptane, which may be separated from the reaction mixture in form of the zinc mercaptide. By heating with acetic anhydride the 2.4.6-trimethyl-7-acetylamino-benzthiazole is obtainable. After recrystallization from its alcoholic solution this compound forms colorless crystals melting at about 208° C. By saponification with hydrochloric acid the 2.4.6-trimethyl-7-amino-benzthiazole is obtainable in form of colorless crystals melting at about 128° C.

The base 2-methyl-6-dimethylamino-benzthiazole corresponding to the formula

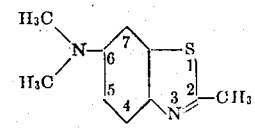

has already been described; cf. Bernthsen, Ann. 251, page 29.

The base 2-methyl-6-diethyl-amino-benzthiazole corresponding to the formula

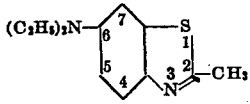

is obtainable analogously to the above described preparation of the dimethyl compound. The chloride forming colorless crystals is easily soluble in water and decomposes when heated to a temperature of about 160° C. under strong evolution of gas. If the base is not free from the chloride by means of an aqueous solution of caustic alkali it separates in form of a yellow oil which solidifies upon cooling.

The base 2-methyl-5-dimethylamino-benzthiazole corresponding to the formula

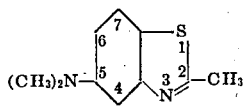

is obtainable as follows. p-bromo-dimethylaniline is nitrated in a mixture of concentrated nitric and sulfuric acid. The formed p-bromo-nitro-dimethylaniline (orange crystals) is converted into p.p'-tetramethyl-diamino-o.o'-dinitrodiphenyl-disulfide (red crystals when crystallized from chlorobenzene) by heating it with the calculated quantity of $Na_2S_2$. From this compound results p-dimethylamino-o-amino-thiophenol by reduction with sodium sulfide in an aqueous alkaline suspension. The latter compound is transformed into 2-methyl-5-dimethylamino-benzthiazole by a treatment with acetic anhydride. The chloride forms colorless crystals which are insoluble in ether, but easily soluble in water.

The base 2.4-dimethyl-6-phenylamino-benzthiazole corresponding to the formula

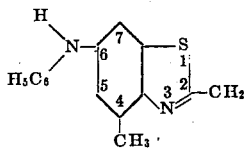

is obtainable by heating 2-amino-3-methyl-5-phenylamino-thiophenol-zinc (cf. U. S. Patent 1,588,384) with acetic anhydride. After crystallization of the compound from benzene it forms colorless crystals which melt at about 138° C. and are easily soluble in benzene, alcohol and glacial acetic acid.

Other bases than those mentioned above may be produced in an analogous manner.

Naphthothiazoles substituted in a naphthalene nucleus may be produced in a manner analogous to the following description:

2-methyl-8-methoxy-naphtho-thiazole corresponding to the formula

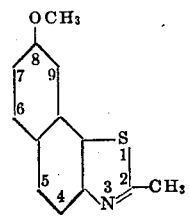

may be produced by converting 2-amino-7-methoxy-naphthylamine

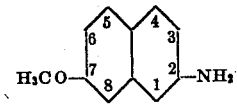

with acetic anhydride into its acetyl compound. This latter is converted, according to the method of Jacobson and Süllwald (Berichte der deutschen chemischen Gesellschaft, vol. 21, page 2627), into the thiaceto-compound by means of phosphorus-pentasulphide. By oxidation with potassium ferricyanide in alkaline solution the 2-methyl-8-methoxy-β-naphthothiazole is obtained.

The following examples illustrate the invention:

*Example 1.*—A mixture of 10 grams of 2-methylbenzthiazole ethiodide 7 grams of ethylisothioacetanilide and 25 cc. of acetic anhydride are boiled for about 4 hours under reflux. After cooling and the addition of much ether a thickly liquid brown mass separates. The ether is decanted and the mass is again washed twice with ether by decantation. The residue is dissolved in about 12 cc. of alcohol at a temperature of about 50 to 60° C. After cooling an intermediate product corresponding probably with the formula

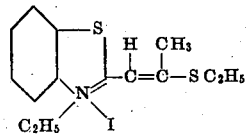

separates in form of crystals. Crystallization may be hastened by rubbing the wall of the vessel with a glass rod and the addition of ether may increase the yield.

3 grams of said intermediate product, 3 grams of 2-methylbenzthiazole ethiodide, 15 cc. of pyridine and 2 cc. of piperidine are mixed and boiled for about 2 hours under reflux. The dye 1.1′ - diethyl-meso-methyl-benzthiocarbocyanine iodide corresponding probably with the formula

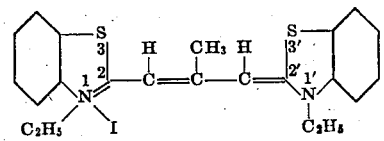

is precipitated on addition of a solution of potassium iodide; it is recrystallized from alcohol.

The alcoholic solution of the dye has an absorption maximum at a wave length of about 550μμ.

Incorporated in a gelatino-silver-bromide emulsion containing about 4 per cent of silver iodide the dye imparts to it a range of sensitivity from about 490μμ to about 680μμ with a maximum at about 590μμ.

*Example 2.*—3 grams of the intermediate product as described in Example 1, 4 grams of 2-methyl-4,5-benzobenzthiazole dimethylsulfate, 12 cc. of pyridine are boiled for 1 to 2 hours under reflux. The dye 1-ethyl-1′-methyl-6′.7′-benzomesomethyl-benzthiocarbocyanine iodide corresponding probably with the following formula:

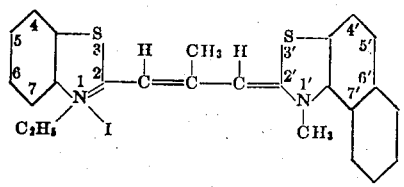

is precipitated on addition of a solution of potassium iodide. By fractional crystallization from alcohol the unsymmetrical carbocyanine can be separated from the by-products formed.

The alcoholic solution of the dye has an absorption maximum at a wave length of about 565μμ.

Incorporated in a gelatino-silver-bromide emulsion containing about 4 per cent of silver iodide the dye imparts to it a range of sensitivity from about 495μμ to about 690μμ with a maximum at about 610μμ.

Example 3.—A mixture of 2 grams of the intermediate product described in Example 1, 3 grams of 5-diethylamino-2-methylbenzthiazole-ethiodide and 10 cc. of pyridine is heated until boiling and, on addition of 2 cc. of piperidine boiled for 2½ hours. The dye 1.1'-diethyl-6'-diethylamino-mesomethyl-benzthiocarbocyanine iodide corresponding probably with the formula

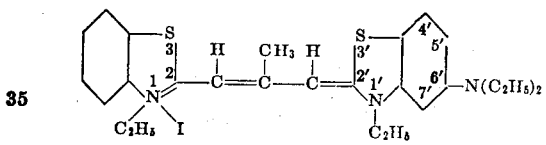

is precipitated by addition of a solution of potassium iodide. By a fractional crystallization from alcohol the unsymmetrical carbocyanine may be separated from the by-products formed.

The alcoholic solution of the dye has an absorption maximum at a wave length of about 585μμ.

Incorporated in a gelatino-silver-bromide emulsion containing about 4 per cent of silver iodide the dye imparts to it a range of sensitivity from about 500μμ to about 725μμ with a maximum at about 620μμ which is very flat.

Example 4.—3 grams of the intermediate product described in Example 1, 4 grams of 2-methyl-6.7-benzobenzthiazole-diethylsulfate, 17 cc. of pyridine are caused to interact as described in Example 2. The dye 1.1'-diethyl-4'.5'-benzo-mesomethylbenzthiocarbocyanine corresponding probably with the formula

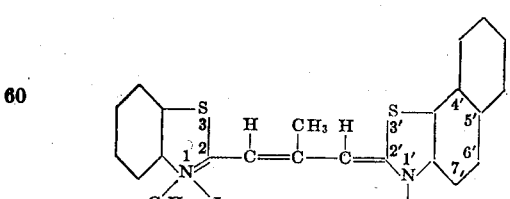

is isolated by a fractional crystallization from alcohol.

The alcoholic solution of the dye has an absorption maximum at a wave length of about 565μμ.

Incorporated in a gelatino-silver-bromide emulsion containing about 4 per cent of silver iodide the dye imparts to it a range of sensitivity from about 500μμ to about 670μμ with a maximum at about 595μμ.

Example 5.—A mixture of 10 grams of 2-methylbenzselenazole-ethiodide, 7 grams of ethylisothioacetanilide and 15 cc. of acetic acid anhydride are boiled for 5 hours. On allowing the reaction mass to stand for several hours the intermediate product corresponding probably with the formula:

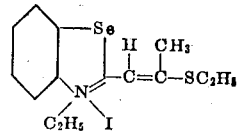

precipitates in a crystalline form. The precipitation may be hastened by the addition of ether. A mixture of 3,2 grams of this intermediate product, 3 grams of 2-methylbenzselenazole-ethiodide, 15 cc. of pyridine and 2 cc. of piperidine is boiled for about 3 hours. There results the dye 1.1'-diethyl-mesomethyl-benzselenocarbocyanine iodide corresponding probably with the formula

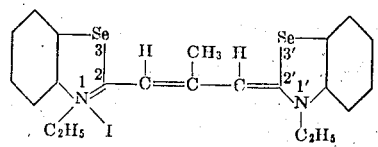

The alcoholic solution of the dye has an absorption maximum at a wave length of about 555μμ.

Incorporated in a gelatino-silver-bromide emulsion containing about 4 per cent of silver iodide the dye imparts to it a range of sensitivity from about 500μμ to about 675μμ with a maximum at about 605μμ.

Example 6.—A mixture of 3,2 grams of the intermediate product described in Example 5, 6 grams of 2-methyl-5-diethylaminobenzthiazole-ethiodide, 25 cc. of pyridine, and 2 cc. of piperidine are boiled for 1½ to 2 hours. From the reaction mixture the unsymmetrical dye 1.1'-diethyl-6'-diethylaminomesomethyl-benzseleno-benzthiocarbocyanine iodide corresponding probably with the formula

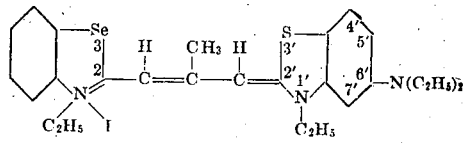

is precipitated from the reaction mixture on addition of a solution of potassium iodide and freed from by-products by fractional crystallization.

The alcoholic solution of the dye has an absorption maximum at a wave length of about 585μμ.

Incorporated in a gelatino-silver-bromide emulsion containing about 4 per cent of silver iodide the dye imparts to it a range of sensitivity from about 500μμ to about 715μμ with a maximum at about 620μμ which is very flat.

Example 7.—A mixture of 2 grams of the intermediate product described in Example 5, 3 grams of 2-methyl-4.5-benzobenzthiazole-dimethylsulfate, 20 cc. of pyridine and 2.5 cc. of piperidine are boiled for 1½ to 2 hours. The further treatment is the same as in Example 5. There is obtained the dye 1.-ethyl-1'-methyl-6'.7'-benzo-mesomethyl-benzselenobenzthiocarbocyanine iodide corresponding probably with the formula

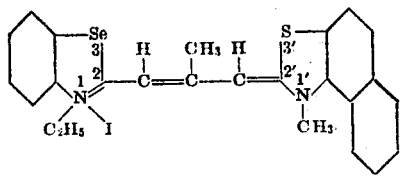

The alcoholic solution of the dye has an absorption maximum at a wave length of about 570μμ.

Incorporated in a gelatino-silver-bromide emulsion containing about 4 per cent of silver iodide the dye imparts to it a range of sensitivity from about 500μμ to about 695μμ with a maximum at about 610μμ.

Example 8.—10 grams of 5-methoxy-2-methyl-benzselenazole-ethiodide, 7 cc. of ethylisothiopropionanilide and 7 cc. of pyridine are heated for 1½ to 2 hours in an oil bath having a temperature of about 130° C. while stirring frequently.

The reaction mixture is then cooled to about 50° C. and there are added 10 cc. of methanol and 11 cc. of a 10 per cent aqueous solution of sodium perchlorate. After cooling the dye 1.1'-diethyl-6.6'-dimethoxy-mesoethyl-benzselenocarbocyanine perchlorate precipitates and is separated by filtration washed with a large amount of ether and recrystallized from alcohol. The dye is obtained in form of green, or frequently copper-colored crystals.

The alcoholic solution of the dye has an absorption maximum at a wave length of about 580μμ.

Incorporated in a gelatino-silver-bromide emulsion containing about 4 per cent of silver-iodide the dye imparts to it a range of sensitivity from about 500μμ to about 710μμ with a maximum at about 670μμ.

The dye corresponds probably with the following formula:

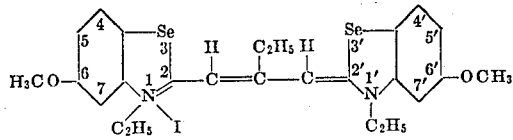

The same dye is obtainable by substituting in the foregoing example ethylisothiopropion-nitranilide (I) or ethylisothiopropiontoluide (II) for ethylisothiopropionanilide.

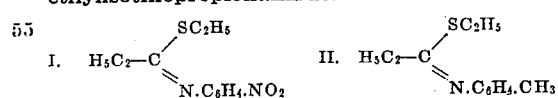

Example 9(a).—10 grams of 2-methylbenzthiazole-ethiodide and 9 cc. of ethylisothiopropionanilide are heated for 4 hours to 165° C. to 170° C. while repeatedly stirring.

After cooling the solidified melt is dissolved in 15 cc. of warm alcohol and the cooled solution is mixed with ether. After a short time the dyestuff-intermediate separates, is filtered, washed with ether and recrystallized from alcohol. The purified product melts at 185° C. to 186° C.

Example 9(b).—5 grams of said intermediate product, 5 grams of 2-methyl-5-methoxybenzselenazole ethiodide and 20 cc. of pyridine are heated for about 1½ hours on an oil bath having a temperature of 140° C., so that about half of the employed pyridine quantity evaporates.

Hereafter there are added to the reaction mixture a few cc. of a 10 per cent aqueous solution of potassium iodide and a small amount of water. After cooling the dye 1.1'-diethyl-6'-methoxy-mesoethyl-benzthiobenzselenocarbocyanine iodide separates in form of crystals. The dye may also be precipitated by the addition of a large quantity of water. In this case it may separate in form of an oil which, however, will solidify after prolonged standing. The dye which is washed with ether and recrystallized from alcohol corresponds probably with the formula

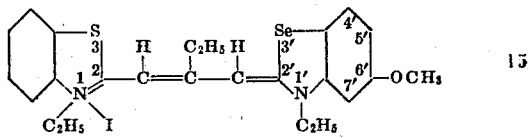

The alcoholic solution of the dye has a large absorption maximum at a wave length of about 565 to 570μμ.

Incorporated in a gelatino-silver-bromide emulsion containing about 4 per cent of silver iodide the dye imparts to it a range of sensitivity from about 500μμ to about 705μμ with a maximum at about 650μμ.

Example 10.—By operating in the manner described in Example (9b) and starting from a mixture of 5 grams of the intermediate product described in Example (9a), 5 grams of 2-methyl-4.5-benzobenzthiazole dimethyl-sulfate and 20 cc. of pyridine there is produced the dye 1-ethyl-1'-methyl-6'.7'-benzomesoethyl-benzthiocarbocyanine iodide corresponding with the formula

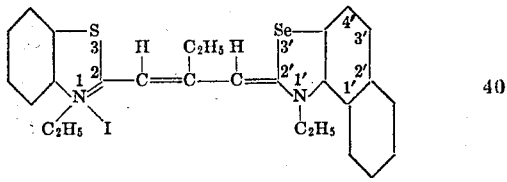

The alcoholic solution of the dye has an absorption maximum at a wave length of about 570μμ.

Incorporated in a gelatino-silver-bromide emulsion containing about 4 per cent of silver-iodide the dye imparts to it a range of sensitivity from about 500μμ to about 695μμ with a maximum at about 630μμ which is very flat.

Example 11.—By operating as described in Example (9b), but using 5 grams of the intermediate product described in Example (9a), 5 grams of 2-methylbenzthiazole ethiodide and 20 cc. of pyridine, there is obtained the dye 1.1'-diethylmesoethyl-benzthiocarbocyanine iodide corresponding probably with the formula

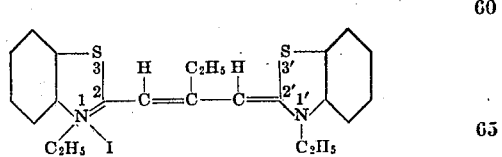

The alcoholic solution of the dye has an absorption maximum at a wave length of about 555μμ.

Example 12.—By operating in the manner described in Example (9b) and starting from 4 grams of the intermediate product described in Example (9a), 4.5 grams of 2-methyl-6.7-benzobenzthiazole diethylsulfate and 25 cc. of pyridine there is obtained the dye 1.1'-diethyl-4'.5'-benzo-mesoethyl-benzthiocarbocyanine iodide corresponding probably with the formula

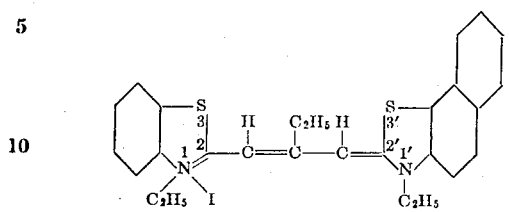

The alcoholic solution of the dye has an absorption maximum at a wave length of about 570μμ.

Incorporated in a gelatino-silver-bromide emulsion containing about 4 per cent of silver iodide the dye imparts to it a range of sensitivity from about 500μμ to about 680μμ with a maximum at about 620μμ which is very flat.

Example 13.—By operating in the manner described in Example (9b) but starting from 5 grams of the intermediate product described in Example (9a), 5 grams of 2-methylbenzselenazole ethiodide and 20 cc. of pyridine there is obtained the dye 1.1'-diethyl-mesoethyl-benzthiobenzselenocarbocyanine iodide corresponding probably with the formula

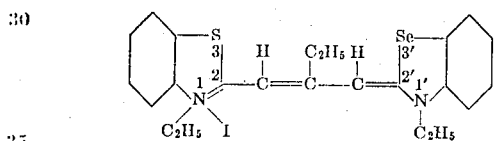

The alcoholic solution of the dye has an absorption maximum at a wave length of about 555μμ to about 560μμ.

Incorporated in a gelatino-silver-bromide emulsion containing about 4 per cent of silver iodide the dye imparts to it a range of sensitivity from about 500μμ to about 685μμ with a maximum at about 630μμ.

Example 14(a).—10 grams of 2-methylbenzselenazole ethiodide and 9 cc. of ethylisothiopropionanilide are heated to about 165 to 170° C. for about 1¼ hours while repeatedly stirring. There is produced a homogeneous melt of dark color which is dissolved in 15 cc. of alcohol. This solution is mixed with about 20 cc. of ether while stirring. The intermediate product which crystallizes is filtered and recrystallized from alcohol.

Example 14(b).—5 grams of this intermediate product, 5 grams of 2-methyl-5-methoxy-benzselenazole ethiodide and 20 cc. of pyridine are heated for about 1½ hours on an oil bath having a temperature of 140° C., so that about half of the employed pyridine evaporates. Hereafter a 10 per cent aqueous solution of sodium perchlorate and much water are added to the reaction mass. The dye 1.1'-diethyl-6'-methoxy-mesoethyl-benzselenocarbocyanine perchlorate corresponding probably with the formula

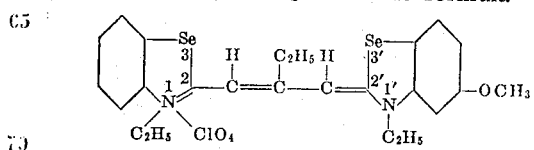

separates. The further working up is made as described in Example (14b).

The alcoholic solution of the dye has a large absorption maximum at a wave length of about 570 to 575μμ.

Incorporated in a gelatino-silver-bromide emulsion containing about 4 per cent of silver iodide the dye imparts to it a range of sensitivity from about 505μμ to about 700μμ with a maximum at about 655μμ.

Example 15.—When working according to the preceding example and starting from 5 grams of the intermediate product described in this example, 5 grams of 2-methyl-4.5-benzobenzthiazole dimethylsulfate and 20 cc. of pyridine there is obtained the dye 1-ethyl-1'-methyl-6'.7'-benzomesoethyl-benzselenobenzthiocarbocyanine perchlorate corresponding probably with the formula

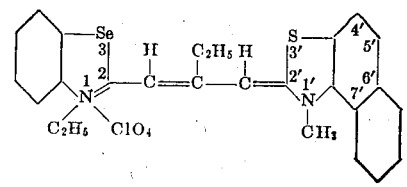

The alcoholic solution of the dye has an absorption maximum at wave length of about 575μμ.

Incorporated in a gelatino-silver-bromide emulsion containing about 4 per cent of silver iodide the dye imparts to it a range of sensitivity from about 500μμ to about 725μμ with a maximum at about 650μμ.

Example 16(a).—10 grams of 2-methylbenzthiazole methiodide and 9 cc. of ethylisothiopropionanilide are heated for about 1½ hours to 165 to 170° C. After cooling the solidified melt is dissolved in about 15 cc. of alcohol, and the intermediate product is precipitated with ether.

Example 16(b).—2 grams of the intermediate product, 2 grams of 2-methyl-6.7-benzobenzthiazole diethylsulfate are worked up according to Example (9b). There is obtained the dye 1-methyl-1'-ethyl-4'.5'-benzo-meso-ethyl-benzthiocarbocyanine iodide corresponding probably with the formula

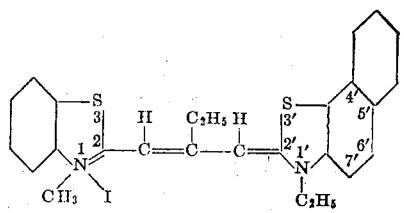

The alcoholic solution of the dye has an absorption maximum at a wave length of about 565μμ.

Incorporated in a gelatino-silver-bromide emulsion containing about 4 per cent of silver iodide the dye imparts to it a range of sensitivity from about 510μμ to about 690μμ with a maximum at about 650μμ.

Example 17.—20 grams of 2-methyl-5-methoxybenzselenazole ethiodide, 14 cc. of ethylisothiobutyranilide and 14 cc. of pyridine are heated for about 1½ hours on an oil bath having a temperature of about 140° C., so that half of the employed pyridine is evaporated. Hereafter 10 cc. of methanol, 25 cc. of a 10 per cent aqueous solution of sodium perchlorate and much water are added to the mixture. The raw dye 1.1'-diethyl-6.6'-dimethoxy-mesopropyl-benzselenocarbocyanine perchlorate corresponding probably with the formula

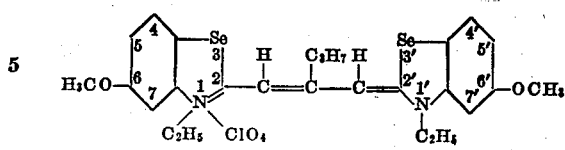

separates in form of an oil which by cooling in ice congeals to a semi-solid mass. The residue which remains after decanting the supernatant mixture of water and pyridine is dissolved in about 30 to 40 cc. of warm alcohol. From this solution the dye separates on cooling in form of green crystals.

The alcoholic solution of the dye has an absorption maximum at a wave length of about 585$\mu\mu$.

Incorporated in a gelatino-silver-bromide emulsion containing about 4 per cent of silver iodide the dye imparts to it a range of sensitivity from about 500$\mu\mu$ to about 705$\mu\mu$ with a maximum at about 665$\mu\mu$.

*Example 18.*—When starting from 5 grams of the intermediate product described in Example (9a), 5 grams of 2-methylbenzoxazole ethiodide and 20 cc. of pyridine, and working according to Example (9b) there is obtained the dye 1.1'-diethyl-meso-ethyl-benzthiobenzoxocarbocyanine iodide corresponding with the formula

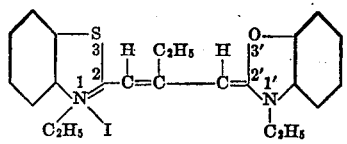

The alcoholic solution of the dye has an absorption maximum at a wave length of about 525$\mu\mu$.

Incorporated in a gelatino-silver-bromide emulsion containing about 4 per cent of silver iodide the dye imparts to it a range of sensitivity from about 500$\mu\mu$ to about 625$\mu\mu$ with a maximum at about 560$\mu\mu$.

*Example 19.*—10 grams of 2-methyl-5-methoxybenzselenazole ethiodide are heated with 7 cc. of ethylisothio-p-methoxybenzanilide corresponding probably with the formula

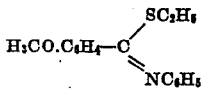

and 8 cc. of pyridine for about 2 hours to 130° C. The dye 1.1'-diethyl-6.6'-methoxy-mesomethoxyphenyl-benzseleno-carbocyanine iodide is precipitated from the reaction mixture by addition of a few cc. of a 10 per cent aqueous solution of potassium iodide and water. The raw product obtained is recrystallized from alcohol. The dye corresponds probably with the formula

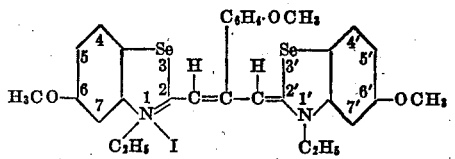

The dye has a principal absorption maximum at a wave length of about 600$\mu\mu$ and a less definite maximum at a wave length of about 560$\mu\mu$.

Incorporated in a gelatino-silver-bromide emulsion containing about 4 per cent of silver iodide the dye imparts to it a sensitivity to waves from about 525$\mu\mu$ to about 715$\mu\mu$ with a maximum at about 635$\mu\mu$. The emulsion has a distinct absorption gap in the green region of the spectrum.

My invention is not limited to the foregoing examples nor to the specific details given therein. Numerous other embodiments are possible and I contemplate as included within my invention all such modifications and equivalents as within the scope of the appended claims. So, for instance, other nuclei which may be substituted or unsubstituted than those shown in the examples may be fused on the heterocyclic rings linked to both ends of the polymethine chain. The substituents of the nuclei may be linked to any position and the nuclei may contain one or more substituents. Other quaternary ammonium salts containing in $\alpha$-position to the nitrogen atom a methyl group capable of reaction than those covered by general Formula (1) likewise may be suitable as a starting material.

The formulæ of the dyes as given herein represent the molecular structure of my new dyes so far as known. If, however, in future it should become evident that the formulæ do not exactly correspond with the dyes this fact will not affect my invention, since the dyes will be easily identified by the method of producing the same which has been fully described in the examples.

What I claim is:

1. The process which comprises acting while heating upon a quaternary ammonium salt corresponding with the formula

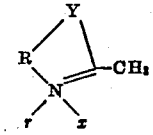

wherein Y is a member of the group consisting of S, Se, O,
R is a member of the group consisting of phenylene and naphthylene,
$r$=alkyl,
$x$=an acid radical,
with a thioimide corresponding with the formula

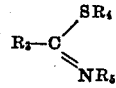

wherein $R_3$ is a member of the group consisting of alkyl radicals and monocyclic aryl radicals
$R_4$=alkyl
$R_5$=a phenyl.

2. The process which comprises acting while heating upon a quaternary ammonum salt corresponding with the formula

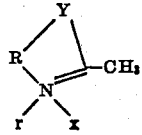

wherein Y is a member of the group consisting of S, Se, O,
R is a member of the group consisting of phenylene and naphthylene,
$r$=alkyl,
X=an acid radical,
with a thioimide corresponding with the formula

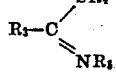

wherein R₃ is a member of the group consisting
of alkyl radicals and monocyclic aryl
radicals
R₄=alkyl,
R₅=a phenyl,
in the presence of an acid condensing agent.

3. The process which comprises acting upon a quaternary ammonium salt corresponding with the formula

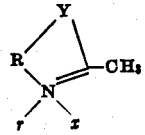

wherein Y is a member of the group consisting of
S, Se, O,
R is a member of the group consisting of
phenylene and naphthylene,
r=alkyl,
x=an acid radical,
with a thioimide corresponding with the formula

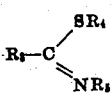

wherein R₃ is a member of the group consisting
of alkyl radicals and monocyclic aryl
radicals
R₄=alkyl,
R₅=a phenyl,
by heating the two compounds.

4. The process which comprises acting while heating upon a quaternary ammonium salt corresponding with the formula

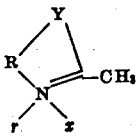

wherein Y is a member of the group consisting of
S, Se, O,
R is a member of the group consisting of
phenylene and naphthylene,
r=alkyl,
x=an acid radical,
with a thioimide corresponding with the formula

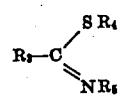

wherein R₃ is a member of the group consisting
of alkyl radicals and monocyclic aryl
radicals
R₄=alkyl,
R₅=a phenyl,
in the presence of acetic anhydride.

5. The process which comprises acting upon a quaternary ammonium salt corresponding with the formula

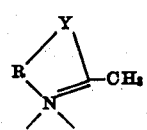

wherein Y is a member of the group consisting of
S, Se, O,
R is a member of the group consisting of
phenylene and naphthylene,
r=alkyl,
x=an acid radical, with a thioimide corresponding with the formula

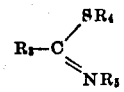

wherein R₃ is a member of the group consisting
of alkyl radicals and monocyclic aryl
radicals
R₄=alkyl,
R₅=a phenyl,
by heating the two compounds to about 165 to 170° C.

6. The process which comprises acting while heating upon a quaternary ammonium salt corresponding with the formula

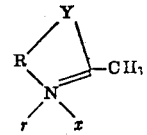

wherein Y is a member of the group consisting
of S, Se, O,
R is a member of the group consisting
of phenylene and naphthylene,
r=alkyl,
x=an acid radical,
with a thioimide corresponding with the formula

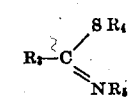

wherein R₃ is a member of the group consisting
of alkyl radicals and monocyclic aryl
radicals,
R₄=alkyl,
R₅=a phenyl,
in the presence of a basic condensing agent.

7. The process which comprises acting while heating upon a quaternary ammonium salt corresponding with the formula

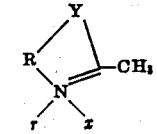

wherein Y is a member of the group consisting
of S, Se, O,
R is a member of the group consisting
of phenylene and naphthylene,
r=alkyl,
x=an acid radical,
with a thioimide corresponding with the formula

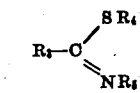

wherein R₃ is a member of the group consisting
of alkyl radicals and monocyclic aryl
radicals,
R₄=alkyl,
R₅=a phenyl,
in the presence of pyridine.

8. The process which comprises acting while heating upon a quaternary ammonium salt corresponding with the formula

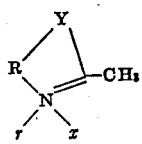

wherein Y is a member of the group consisting of S, Se, O,
R is a member of the group consisting of phenylene and naphthylene,
r=alkyl,
x=an acid radical,
with a thioimide corresponding with the formula

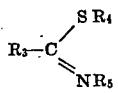

wherein $R_3$ is a member of the group consisting of alkyl radicals and monocyclic aryl radicals,
$R_4$=alkyl,
$R_5$=a phenyl,
in the presence of a mixture of pyridine and piperidine.

9. The process which comprises acting while heating upon a quaternary ammonium salt corresponding with the formula

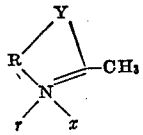

wherein Y is a member of the group consisting of S, Se, O,
R is a member of the group consisting of phenylene and naphthylene,
r=alkyl,
x=an acid radical,
with a thioimide corresponding with the formula

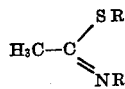

wherein $R_4$=alkyl,
$R_5$=a phenyl,
in the presence of an acid condensing agent.

10. The process which comprises acting while heating upon a quaternary ammonium salt corresponding with the formula

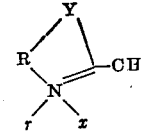

wherein Y is a member of the group consisting of S, Se, O,
R is a member of the group consisting of phenylene and naphthylene,
r=alkyl,
x=an acid radical,
with a thioimide corresponding with the formula

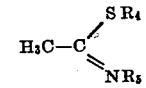

wherein $R_4$=alkyl,
$R_5$=a phenyl,
in the presence of acetic anhydride.

11. The process which comprises acting upon a quaternary ammonium salt corresponding with the formula

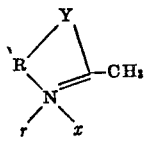

wherein Y is a member of the group consisting of S, Se, O,
R is a member of the group consisting of phenylene and naphthylene,
r=alkyl,
x=an acid radical,
with a thioimide corresponding with the formula

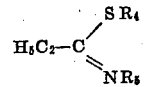

wherein $R_4$=alkyl,
$R_5$=a phenyl,
by heating the two components to about 165 to 170° C.

12. The process which comprises acting while heating upon a quaternary ammonium salt corresponding with the formula

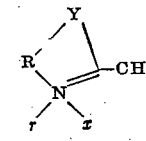

wherein Y is a member of the group consisting of S, Se, O,
R is a member of the group consisting of phenylene and naphthylene,
r=alkyl,
x=an acid radical,
with a thioimide corresponding with the formula

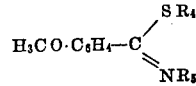

wherein $R_4$=alkyl,
$R_5$=a phenyl,
in the presence of pyridine.

13. The process which comprises acting while heating upon a quaternary ammonium salt corresponding with the formula

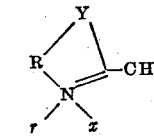

wherein Y is a member of the group consisting of S, Se, O,
R is a member of the group consisting of phenylene and naphthylene,
r=alkyl,
x=an acid radical,
with a thioimide corresponding with the formula

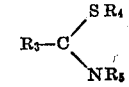

wherein $R_3$ is a member of the group consisting of alkyl radicals and monocyclic aryl radicals
$R_4$=alkyl,
$R_5$=a phenyl,
in the presence of an acid condensing agent and condensing the resulting product in the presence of a basic condensing agent with a quaternary ammonium salt corresponding with the formula

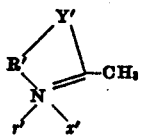

wherein Y' is a member of the group consisting of S, Se, O,
R' is a member of the group consisting of vinylene, phenylene and naphthylene,
r'=alkyl,
x'=an acid radical,
and in which Y', R' and r' may be the same or different radicals as Y, R and r.

14. The process which comprises acting upon a quaternary ammonium salt corresponding with the formula

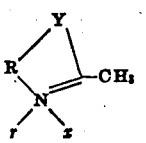

wherein Y is a member of the group consisting of S, Se, O,
R is a member of the group consisting of phenylene and naphthylene,
r=alkyl,
x'=an acid radical,
with a thioimide corresponding with the formula

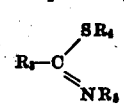

wherein R₃ is a member of the group consisting of alkyl radicals and monocyclic aryl radicals
R₄=alkyl
R₅=a phenyl,
by heating the two compounds and condensing the resulting product in the presence of a basic condensing agent with a quaternary ammonium salt corresponding with the formula

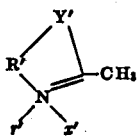

wherein Y' is a member of the group consisting of S, Se, O,
R'=vinylene, phenylene and naphthylene,
r'=alkyl,
x'=an acid radical,
and in which Y', R' and r' may be the same or different radicals as Y, R and r.

15. The process which comprises heating 2-methylbenzthiazole ethiodide and ethylisothiopropionanilide to about 165 to 170° C., separating from the reaction mixture the intermediate product formed from said compounds, and condensing said intermediate product with 2-methyl-5-methoxybenzselenazole ethiodide in the presence of pyridine.

16. The process which comprises boiling a mixture of 2-methylbenzthiazole ethiodide, ethylisothioacetanilide and acetic anhydride, separating from the reaction mixture the intermediate product formed of the 2-methylbenzthiazole ethiodide and the ethylisothioacetanilide, and condensing said intermediate product with 2-methyl-4.5-benzobenzthiazole dimethylsulfate in the presence of pyridine.

17. The process which comprises heating a quaternary ammonium salt of a heterocyclic base containing in its molecule a nucleus selected from the group consisting of the thiazole nucleus the selenazole nucleus and the oxazole nucleus having a methyl group capable of reaction in α-position to the nitrogen atom, with the alkyl ester of a thioimidic acid substituted by a monocyclic aryl radicle.

18. An unsymmetrical carbocyanine salt having a heterocyclic group and a heterocyclic group in salt form, selected from the group consisting of benzothiazoles, naphthothiazoles, benzoselenazoles, naphthoselenazoles, benzoxazoles and naphthoxazoles linked in α-position to the nitrogen atom each to one end of a trimethenyl chain which carries a substituent at the central carbon atom selected from the class consisting of alkyl and monocyclic aryl radicles, the sum of the atoms of the one heterocyclic group being different from that of the other while disregarding the salt forming anion.

19. An unsymmetrical carbocyanine salt having a heterocyclic group and a heterocyclic group in salt form, selected from the group consisting of benzothiazoles, naphthothiazoles, benzoselenazoles, naphthoselenazoles, benzoxazoles and naphthoxazoles linked in α-position to the nitrogen atom each to one end of a trimethenyl chain which carries an alkyl group at the central carbon atom, the two heterocyclic groups being different in structure while disregarding the salt forming anion.

20. An unsymmetrical carbocyanine salt having a heterocyclic group and a heterocyclic group in salt form, selected from the group consisting of benzothiazoles, naphthothiazoles, benzoselenazoles, naphthoselenazoles, benzoxazoles and naphthoxazoles linked in α-position to the nitrogen atom each to one end of a tri-methenyl chain which carries a methyl group at the central carbon atom, the two heterocyclic groups being different in structure while disregarding the salt forming anion.

21. An unsymmetrical carbocyanine salt having a heterocyclic group and a heterocyclic group in salt form, selected from the group consisting of benzothiazoles, naphthothiazoles, benzoselenazoles, naphthoselenazoles, benzoxazoles and naphthoxazoles linked in α-position to the nitrogen atom each to one end of a tri-methenyl chain which carries an ethyl group at the central carbon atom, the two heterocyclic groups being different in structure while disregarding the salt forming anion.

22. Trimethinecyanine dyes having the general formula

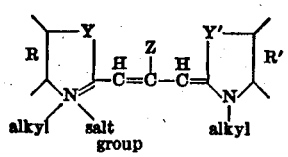

wherein
Y and Y' are selected from the class consisting of S, Se and O,
R and R' are selected from the group consisting of phenylene, naphthylene, alkyl phenylene, alkoxy phenylene, amino phenylene and alkyl amino phenylene, Y being different from Y' when R is the same as R' and R being different from R' when Y is the same as Y'; and Z being selected from the class consisting of alkyl and monocyclic aryl radicles.

23. The process which comprises heating 2-methylbenzthiazole ethiodide and ethylisothiopropionanilide to about 165 to 170° C., separating from the reaction mixture the intermediate product formed from said compounds and condensing said intermediate product with 2-methylbenzoxazole ethiodide in the presence of pyridine.

24. The dye 1.1'-diethyl-6'.7'-benzobenzthio-mesomethyl-carbocyanine iodide.

25. The dye 1.1'-diethyl-6'-methoxy-benzthio-benzselenomesoethyl-carbocyanine iodide.

26. The dye 1.1'-diethyl-mesoethyl-benzthio-benzoxo-carbocyanine iodide.

ROBERT KOSLOWSKY.